US012095372B2

United States Patent
Chan et al.

(10) Patent No.: US 12,095,372 B2
(45) Date of Patent: Sep. 17, 2024

(54) VOLTAGE CONVERTER, POWER SUPPLY AND METHOD OF CONTROLLING VOLTAGE CONVERTER

(71) Applicant: Murata Manufacturing Co., Ltd., Nagaokakyo (JP)

(72) Inventors: Chukhung Chan, Nagaokakyo (JP); Chuipong Liu, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 234 days.

(21) Appl. No.: 17/898,621

(22) Filed: Aug. 30, 2022

(65) Prior Publication Data

US 2023/0063842 A1 Mar. 2, 2023

(30) Foreign Application Priority Data

Aug. 31, 2021 (CN) .......................... 202111017821.2

(51) Int. Cl.
*H02M 3/158* (2006.01)
*H02J 1/10* (2006.01)
*H02M 1/00* (2007.01)

(52) U.S. Cl.
CPC ........... *H02M 3/1584* (2013.01); *H02J 1/102* (2013.01); *H02M 1/0025* (2021.05)

(58) Field of Classification Search
CPC ............ H02M 1/0003; H02M 1/0025; H02M 1/0043; H02M 1/0067; H02M 3/1584–1586; H02J 1/102
See application file for complete search history.

(56) References Cited

U.S. PATENT DOCUMENTS

| 5,157,269 | A  | * | 10/1992 | Jordan  | H02J 1/10 307/53 |
| 6,166,455 | A  | * | 12/2000 | Li      | H02J 1/102 307/43 |
| 9,748,830 | B1 | * | 8/2017  | Soleño  | H02J 1/102 |
| 2017/0117715 | A1 | * | 4/2017  | Muccini | H02J 5/00 |
| 2018/0269801 | A1 | * | 9/2018  | Huang   | H02M 1/08 |

FOREIGN PATENT DOCUMENTS

EP 1640850 A1 * 3/2006 ............... G06F 1/26

OTHER PUBLICATIONS

Li, P. et al., "A simple design for paralleling current-mode controlled DC-DC converters," Eighteenth Annual IEEE Applied Power Electronics Conference and Exposition, 2003. APEC '03., Miami Beach, FL, USA, 2003, pp. 898-904 vol. 2, doi: 10.1109/APEC.2003.1179323. (Year: 2003).*

* cited by examiner

*Primary Examiner* — Fred E Finch, III
(74) *Attorney, Agent, or Firm* — Keating & Bennett, LLP

(57) ABSTRACT

A voltage converter includes a converter module to convert an input voltage to an output voltage, a current sharing terminal to be connected in parallel with a current sharing terminal of each of at least one other voltage converter, and a control circuit to generate a first voltage signal proportional to an output current of the converter module with an adjustable first proportional coefficient and output the first voltage signal to the current sharing terminal, generate a first current signal proportional to a second voltage signal at the current sharing terminal with a second proportional coefficient, subtract the output current of the converter module from the first current signal to generate an error current signal, and adjust the output voltage of the converter module based on the error current signal.

20 Claims, 5 Drawing Sheets

VOLTAGE CONVERTER, POWER SUPPLY AND METHOD OF CONTROLLING VOLTAGE CONVERTER

CROSS-REFERENCE TO RELATED APPLICATION(S)

This application claims the benefit of Chinese Patent Application No. 202111017821.2 filed on Aug. 31, 2021. The entire contents of this application are hereby incorporated herein by reference.

BACKGROUND OF THE INVENTION

1. Field of the Invention

The present disclosure relates to a field of power supplies, and more particularly, to a voltage converter, a power supply, and a method of controlling a voltage converter.

2. Description of the Related Art

An active current sharing method is widely used in direct current/alternating current (AC/DC) and DC/DC converter redundant operations. Outputs of a plurality of voltage converters are connected together, so that a total output power of the converters meets power requirements of an application in a case of power redundancy.

The voltage converters involved in the current sharing method may include a master voltage converter and one or more slave voltage converters. In a practical application, a master-slave exchange may frequently occur for various reasons (for example, performance parameters of the various voltage converters involved are inconsistent).

Therefore, a technology that may solve frequent master-slave exchanges is required.

SUMMARY OF THE INVENTION

Preferred embodiments of the present invention provide voltage converters, power supplies, and methods of controlling voltage converters.

According to a preferred embodiment of the present invention, a voltage converter includes a converter module to convert an input voltage to an output voltage, a current sharing terminal to be connected in parallel with a current sharing terminal of each of at least one other voltage converter, and a control circuit to generate a first voltage signal proportional to an output current of the converter module with an adjustable first proportional coefficient and output the first voltage signal to the current sharing terminal, wherein the first proportional coefficient is selected based on whether the voltage converter is a master voltage converter or a slave voltage converter in a current sharing mode, generate a first current signal proportional to a second voltage signal at the current sharing terminal with a second proportional coefficient, wherein the second voltage signal is a largest voltage signal among the first voltage signal and another voltage signal from each current sharing terminal connected in parallel, and the first proportional coefficient is less than or equal to a reciprocal of the second proportional coefficient, subtract the output current of the converter module from the first current signal so as to generate an error current signal, and adjust the output voltage of the converter module based on the error current signal.

According to a preferred embodiment of the present invention, subtracting the output current of the converter module from the first current signal so as to generate an error current signal includes subtracting the output current of the converter module and a margin current from the first current signal so as to generate the error current signal.

According to a preferred embodiment of the present invention, the control circuit further includes a comparison circuit to compare the first voltage signal with the second voltage signal, and output the larger one of the first voltage signal and the second voltage signal as a new second voltage signal.

According to a preferred embodiment of the present invention, the control circuit includes at least one amplifier having different amplification coefficients, and a selector to select one of the at least one amplifier so as to generate the first voltage signal.

According to a preferred embodiment of the present invention, when the voltage converter is the slave voltage converter, the first proportional coefficient is less than the reciprocal of the second proportional coefficient, and/or when the voltage converter is the master voltage converter, a value of the first proportional coefficient is equal to a reciprocal value of the second proportional coefficient.

Specifically, when the voltage converter is the slave voltage converter, the value of the first proportional coefficient is in a range of about 0.5 times to about 0.6 times the reciprocal value of the second proportional coefficient.

According to a preferred embodiment of the present invention, when the voltage converter is the slave voltage converter, and when the voltage converter frequently performs a master-slave conversion, a ratio of a value of the first proportional coefficient to a reciprocal value of the second proportional coefficient is reduced.

According to a preferred embodiment of the present invention, when the voltage converter is the slave voltage converter, and when a conversion speed of the voltage converter is slow in a slave-master conversion, a ratio of a value of the first proportional coefficient to a reciprocal value of the second proportional coefficient is increased.

A preferred embodiment of the present invention provides a power supply including a plurality of the voltage converters according to a preferred embodiment of the present invention.

A preferred embodiment of the present invention provides a method of controlling a voltage converter, the voltage converter includes a converter module to convert an input voltage to an output voltage, a current sharing terminal to be connected in parallel with a current sharing terminal of each of at least one other voltage converter, and a control circuit, and the method includes generating, by the control circuit, a first voltage signal proportional to an output current of the converter module with an adjustable first proportional coefficient and outputting the first voltage signal to the current sharing terminal, wherein the first proportional coefficient is selected based on whether the voltage converter is a master voltage converter or a slave voltage converter in a current sharing mode, generating, by the control circuit, a first current signal proportional to a second voltage signal at the current sharing terminal with a second proportional coefficient, wherein the second voltage signal is a largest voltage signal among the first voltage signal and other voltage signal from each current sharing terminal connected in parallel, and the first proportional coefficient is less than or equal to a reciprocal of the second proportional coefficient, subtracting, by the control circuit, the output current of the converter module from the first current signal so as to generate an error current signal, and adjusting, by the control circuit, the output voltage of the converter module based on the error current signal.

According to a preferred embodiment of the present invention, subtracting the output current of the converter module from the first current signal so as to generate an error current signal includes subtracting the output current of the converter module and a margin current from the first current signal so as to generate the error current signal.

According to a preferred embodiment of the present invention, the method further includes comparing the first voltage signal with the second voltage signal, and outputting the larger one of the first voltage signal and the second voltage signal as a new second voltage signal.

According to a preferred embodiment of the present invention, generating a first voltage signal proportional to an output current of the converter module with an adjustable first proportional coefficient includes selecting one of at least one amplifier having different amplification coefficients so as to generate the first voltage signal.

According to a preferred embodiment of the present invention, when the voltage converter is the slave voltage converter, the first proportional coefficient is less than the reciprocal of the second proportional coefficient, and/or when the voltage converter is the master voltage converter, a value of the first proportional coefficient is equal to a reciprocal value of the second proportional coefficient.

Specifically, when the voltage converter is the slave voltage converter, the value of the first proportional coefficient is in a range of about 0.5 times to about 0.6 times the reciprocal value of the second proportional coefficient.

According to a preferred embodiment of the present invention, when the voltage converter is the slave voltage converter, and when the voltage converter frequently performs a master-slave conversion, a ratio of a value of the first proportional coefficient to a reciprocal value of the second proportional coefficient is reduced.

According to a preferred embodiment of the present invention, when the voltage converter is the slave voltage converter, and when a conversion speed of the voltage converter is slow in a slave-master conversion, a ratio of a value of the first proportional coefficient to a reciprocal value of the second proportional coefficient is increased.

A preferred embodiment of the present invention provides a method of designing a power supply, including connecting current sharing terminals of a plurality of voltage converters designed according to a method according to a preferred embodiment of the present invention in parallel with each other.

The adjustable first proportional coefficient is selected based on whether the voltage converter is a master voltage converter or a slave voltage converter in a current sharing mode, so that a magnitude of the generated first voltage signal may be selected according to a role of the voltage converter in a master-slave current sharing mode, which makes it more difficult, for example, for a magnitude of a first voltage signal of the slave voltage converter to exceed a magnitude of a first voltage signal of the master voltage converter, and thus reduces a frequency of master-slave exchange.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
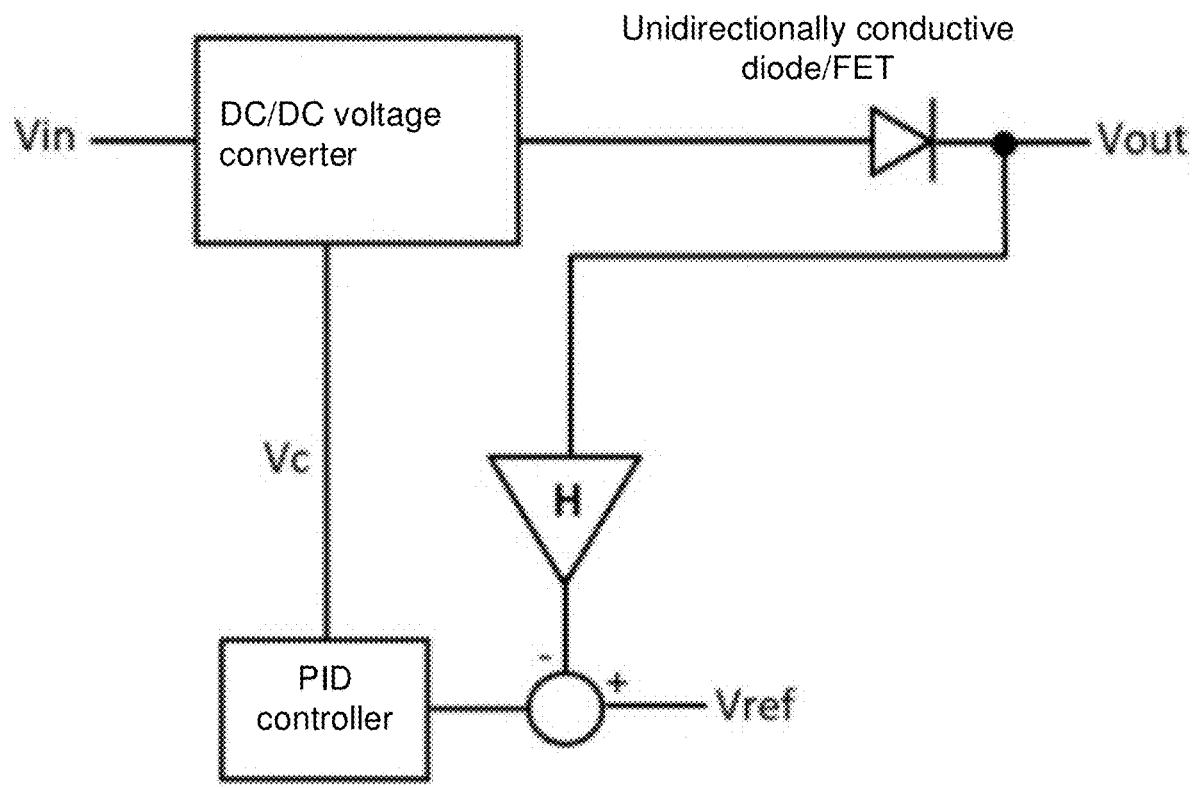
FIG. 1 shows a schematic diagram of an example of a voltage feedback converter.

The preferred embodiments of the present invention will be described below with reference to the accompanying drawings. However, the descriptions are exemplary only, and are not intended to limit the scope of the present invention. In addition, in the following description, descriptions of well-known structures and techniques are omitted to avoid unnecessarily obscuring the concepts of the present invention.

The terms used herein are for the purpose of describing specific preferred embodiments only and are not intended to limit the present invention. As used herein, the words "a," "an," and "the" and the like shall also include the meanings of "a plurality of," "a variety of," unless the context clearly dictates otherwise. Furthermore, the terms "including", "containing" and the like used herein indicate the presence of the features, steps, operations, and/or components, but do not preclude the presence or addition of one or more other features, steps, operations, or components.

All terms (including technical and scientific terms) used herein have the meanings as commonly understood by those skilled in the art, unless otherwise defined. Terms used herein should be construed to have meanings consistent with the context of this specification and should not be construed in an idealized or overly rigid manner.

Some block diagrams and/or flow diagrams are shown in the accompanying drawings. It will be understood that some blocks or combinations thereof in the block diagrams and/or flowcharts may be implemented by, for example, computer program instructions. The computer program instructions may be provided to, for example, a processor of a general-purpose computer, a dedicated-purpose computer, or other programmable data processing apparatus, so that the instructions, when executed by the processor, may create processes or techniques to implement the functions/operations illustrated in the block diagrams and/or flow diagrams.

Accordingly, the techniques of preferred embodiments of the present invention may be implemented in a form of hardware and/or software (including a firmware, a microcode, etc.). In addition, the techniques of preferred embodiments of the present invention may take a form of a computer program product on a computer-readable medium having stored instructions for use by or in conjunction with an instruction execution system. In the context of preferred embodiments of the present invention, the computer-readable medium may be any medium that may include, store, communicate, propagate, or transmit instructions. For example, the computer-readable medium may include, but is not limited to, electrical, magnetic, optical, electromagnetic, infrared, or semiconductor systems, apparatuses, devices, or propagation mediums. Specific examples of the computer-readable medium include: a magnetic storage device, such as a magnetic tape or hard disk (HDD), an optical storage device, such as a compact disk (CD-ROM), a memory, such as a random access memory (RAM) or flash memory, and/or a wired/wireless communication link.

FIG. 1 shows an example of a schematic diagram of a voltage feedback converter. As shown in FIG. 1, the voltage feedback converter includes a voltage controller loop. An output Vout of the converter is amplified by an amplifier with a coefficient H, and then subtracted from a reference signal Vref to generate an error signal Verr. The error signal Verr is input to a proportional-integral-derivative (PID) controller or pole/zero controller to produce a control signal for regulating the output of the converter. In order to avoid currents from other converters flowing back into the converter in a redundant operation, the output of the converter passes through a unidirectionally conductive device (diode/rectifier/MOSFET) before flowing into the amplifier with the coefficient H.

Figure 2:
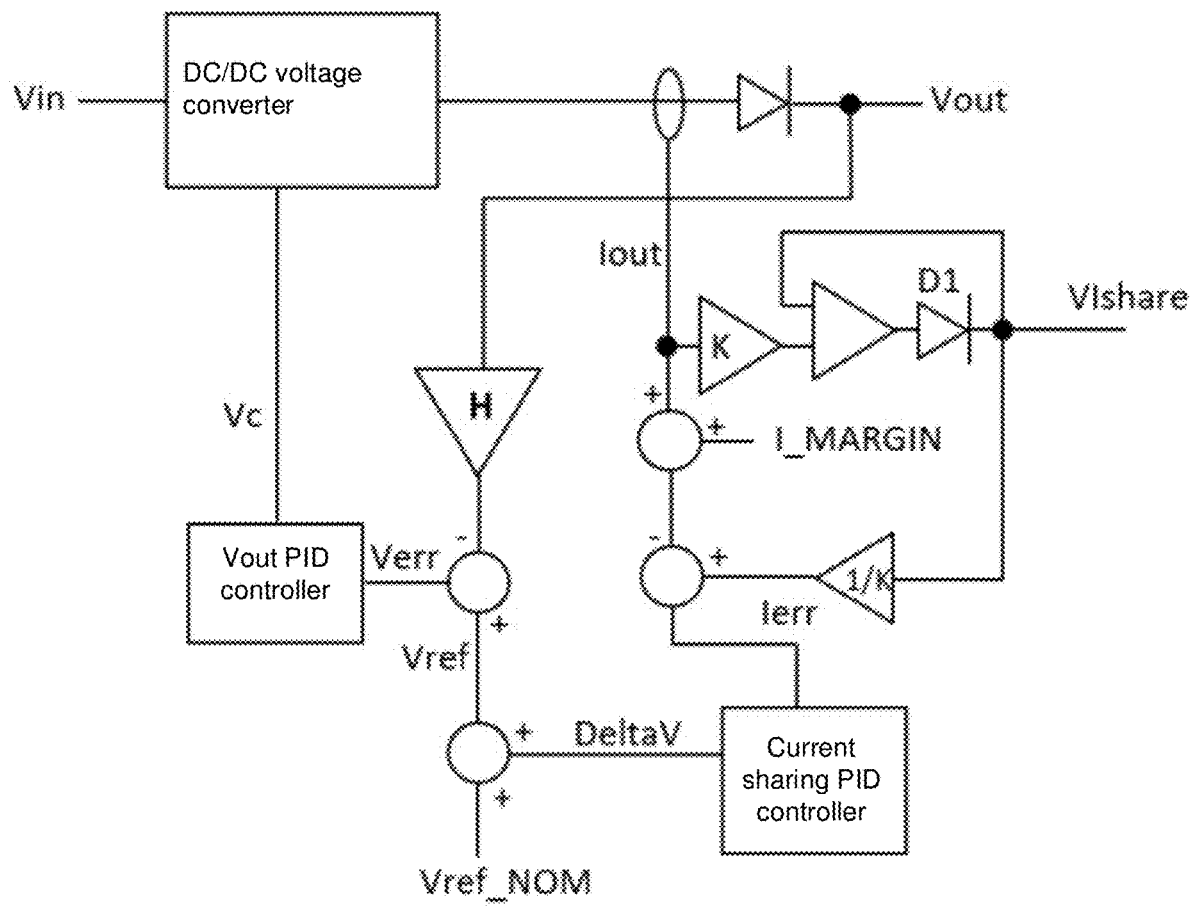
FIG. 2 shows a schematic diagram of an example of another voltage feedback converter.

FIG. 2 shows an example of a schematic diagram of another voltage feedback converter. According to a common active current method shown in FIG. 2, a current sharing signal Vlshare is generated by using an output current. All Vlshare signals of converters connected in parallel are connected together. The Vlshare signal of each converter is proportional to an output current Iout of the converter (by a coefficient K). However, due to a unidirectionally conductive device D1 (such as, for example, a diode shown in FIG. 2), only a largest Vlshare signal may be fed into other converters. An output current of a converter with a largest Vout is a largest output current, the Vlshare signal of the converter is fed to all converters including itself. The converter is a master voltage converter, while the other converters are slave voltage converters. The largest Vlshare signal is then divided by K, and a sum (Iout+I_MARGIN) of Iout and a margin current signal is subtracted so as to generate a current error signal Ierr. I_MARGIN is a pre-defined output current difference, which means that a current with a difference within I_MARGIN is not considered to have a substantial difference in the technical solutions of preferred embodiments of the present invention.

A current sharing PID controller receives the error signal Ierr and generates an incremental signal DeltaV based on the signal. DeltaV is added to a fixed nominal reference signal Vref_NOM to generate an adjusted Vref signal, which is used to generate the error signal Verr, and a control signal Vc used to regulate the converter is generated through a Vout PID controller.

In some preferred embodiments, DeltaV is limited to be greater than 0 and less than DeltaV_MAX used to limit a maximum Vout adjustment value.

When the converter shown in FIG. 2 is a master voltage converter, Vlshare=K×Iout_master, and Ierr_mater equals−I_MARGIN. When an input of the current sharing PID controller is negative, an output DeltaV_master of the controller is equal to 0, and the output of the master voltage converter is unchanged (Vref_master=Vref_NOM).

When the converter shown in FIG. 2 is a slave voltage converter, an output current of the converter is less than that of the master voltage converter. When the output current of the slave voltage converter is lower than (Iout_master−I_MARGIN), Ierr_slave=Iout_master−(Iout_slave+I_MARGIN) will be greater than 0. The current sharing PID controller of the slave voltage converter will output a positive DeltaV_slave, and the signal will increase an output voltage of the slave voltage converter. If the current sharing PID controller has a high integral gain, then Ierr_slave is close to 0 in a steady state, Iout_slave=Iout_master−I_MARGIN.

If Iout_master−Iout_slave<I_MARGIN, then Ierr_slave will be equal to 0, and DeltaV_slave will also be equal to 0.

In a steady state, the output current of the slave voltage converter will change as an output current of the master voltage converter changes, in this case, Iout_master−Iout_slave<I_MARGIN, or
  Iout_slave=Iout_master−I_MARGIN, Vref_master=Vref_NOM, Vref_slave=Vref_NOM+DeltaV_slave (where
  0<=DeltaV_slave<=DeltaV_MAX)

In a process of practicing the above-described technical solutions, it was discovered that the above-described current sharing solution works well in a steady state. For a dynamic system load, operating conditions depend on a response of the Vout PID controller, a response of the current sharing PID controller, and a dynamic response of the converter. In some applications, the converters used in the above-described current sharing solution may not have consistent performances, e.g., from different manufacturers or for other reasons, e.g., may have different converter dynamic responses and/or different Vout PID controller responses and/or different current sharing PID controller responses. This tends to lead to an oscillation of the output voltage and current of the converter. When the output current of the converter oscillates, Iout_slave may temporarily be higher than Iout_master, and lead to an exchange of master/slave roles. In this case, it may be difficult to stop the oscillation because the converters are all temporarily acting as slave voltage converters and trying to adjust their own output. In some solutions, the situation may be improved by increasing a value of I_MARGIN. With the larger value of I_MARGIN, the difference between Iout_slave and Iout_master should be larger to achieve a master-slave exchange. However, it was discovered that the solution may lead to difficulties in meeting current sharing accuracy requirements.

In order to overcome the problems described above, preferred embodiments of the present invention provide voltage converters, power supplies, and methods of designing power supplies.

Figure 3:
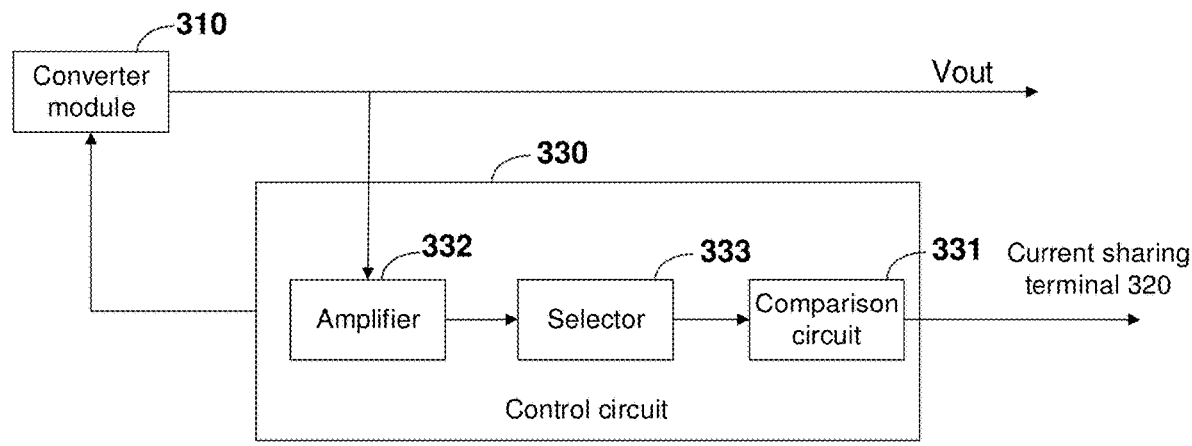
FIG. 3 shows a schematic structural diagram of a voltage converter according to a preferred embodiment of the present invention.

FIG. 3 shows a schematic structural diagram of a voltage converter according to a preferred embodiment of the present invention. According to the schematic structural diagram, a voltage converter 300 includes a converter module 310, a current sharing terminal 320 and a control circuit 330.

The converter module 310 converts an input voltage to an output voltage.

The current sharing terminal 320 is connected in parallel with a current sharing terminal of each of at least one other voltage converter.

The control circuit 330 generates a first voltage signal proportional to an output current of the converter module 310 with an adjustable first proportional coefficient and outputs the first voltage signal to the current sharing terminal 320, wherein the first proportional coefficient is selected based on whether the voltage converter 300 is a master voltage converter or a slave voltage converter in a current sharing state, generates a first current signal proportional to a second voltage signal at the current sharing terminal 320 with a second proportional coefficient, wherein the second voltage signal is a largest voltage signal among the first voltage signal and another voltage signal from each current sharing terminal connected in parallel, and the first proportional coefficient is less than or equal to a reciprocal of the second proportional coefficient, subtracts the output current of the converter module 310 from the first current signal so as to generate an error current signal, and adjusts the output voltage of the converter module 310 based on the error current signal.

The adjustable first proportional coefficient is selected based on whether the voltage converter 300 is a master voltage converter or a slave voltage converter in a current sharing state, so that a magnitude of the generated first voltage signal may be selected according to a function of the voltage converter 300 in a master-slave current sharing mode, which makes it more difficult, for example, for a magnitude of a first voltage signal of the slave voltage converter to exceed a magnitude of a first voltage signal of the master voltage converter, and thus reduces a frequency of master-slave exchange.

In a preferred embodiment of the present invention, subtracting the output current of the converter module 310 from the first current signal so as to generate an error current signal may include subtracting the output current of the converter module 310 and a margin current from the first current signal so as to generate the error current signal.

In a preferred embodiment of the present invention, the control circuit 330 may further include a comparison circuit 331. The comparison circuit 331 compares the first voltage signal with the second voltage signal, and outputs the larger one of the first voltage signal and the second voltage signal as a new second voltage signal.

In a preferred embodiment of the present invention, the control circuit 330 may include at least one amplifier 332 having different amplification coefficients, and a selector 333 to select one of the at least one amplifier so as to generate the first voltage signal. For example, one of the amplifiers 332 functions as a master voltage converter, and at least one of the amplifiers 332 functions as a slave voltage converter. The selector 333 selects an amplifier or amplification coefficient to be used based on whether the voltage converter 300 is a master voltage converter or a slave voltage converter.

In a preferred embodiment of the present invention, when the voltage converter 300 is the slave voltage converter, the value of the first proportional coefficient may be less than the reciprocal value of the second proportional coefficient, and/or when the voltage converter 300 is the master voltage converter, the value of the first proportional coefficient may be equal to the reciprocal value of the second proportional coefficient.

Specifically, when the voltage converter 300 is the slave voltage converter, the value of the first proportional coefficient may be in a range of about 0.5 times to about 0.6 times the reciprocal value of the second proportional coefficient. However, those skilled in the art understand that, according to different implementations, the value range may also change. Such a change shall fall within the scope of the technical solutions of preferred embodiments of the present invention.

In a preferred embodiment of the present invention, when the voltage converter 300 is the slave voltage converter, and when the voltage converter 300 frequently performs a master-slave conversion, a ratio of the value of the first proportional coefficient to the reciprocal value of the second proportional coefficient may be reduced.

In a preferred embodiment of the present invention, when the voltage converter 300 is the slave voltage converter, and when a conversion speed of the voltage converter 300 is slow in a slave-master conversion, a ratio of the value of the first proportional coefficient to the reciprocal value of the second proportional coefficient is increased.

Figure 4:
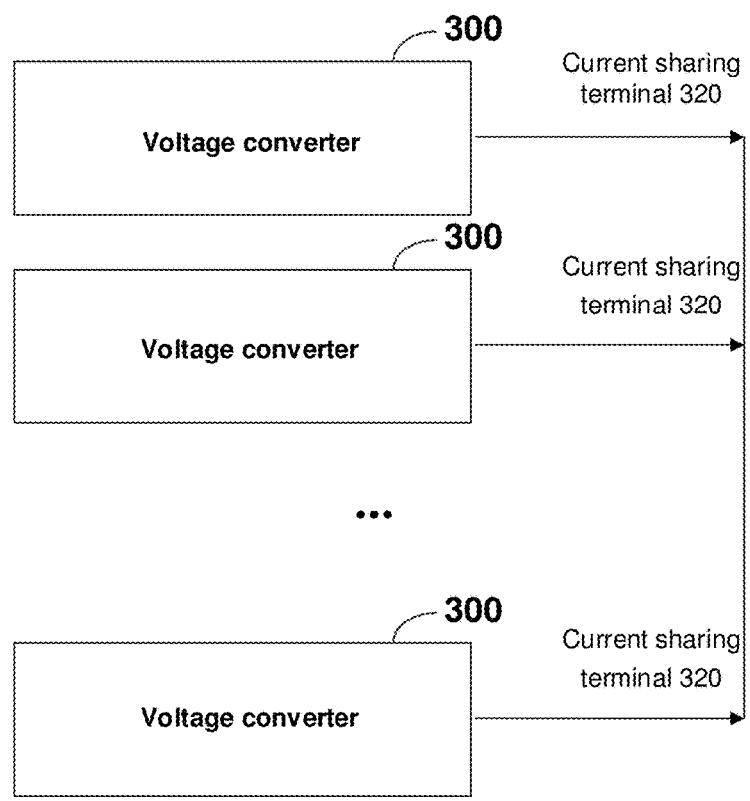
FIG. 4 shows a schematic arrangement of a power supply according to a preferred embodiment of the present invention.

FIG. 4 shows a schematic arrangement of a power supply according to a preferred embodiment of the present invention. As shown in FIG. 4, a current sharing power supply 400 is provided by connecting respective current sharing terminals of a plurality of voltage converters 300 in parallel with each other.

Figure 5:
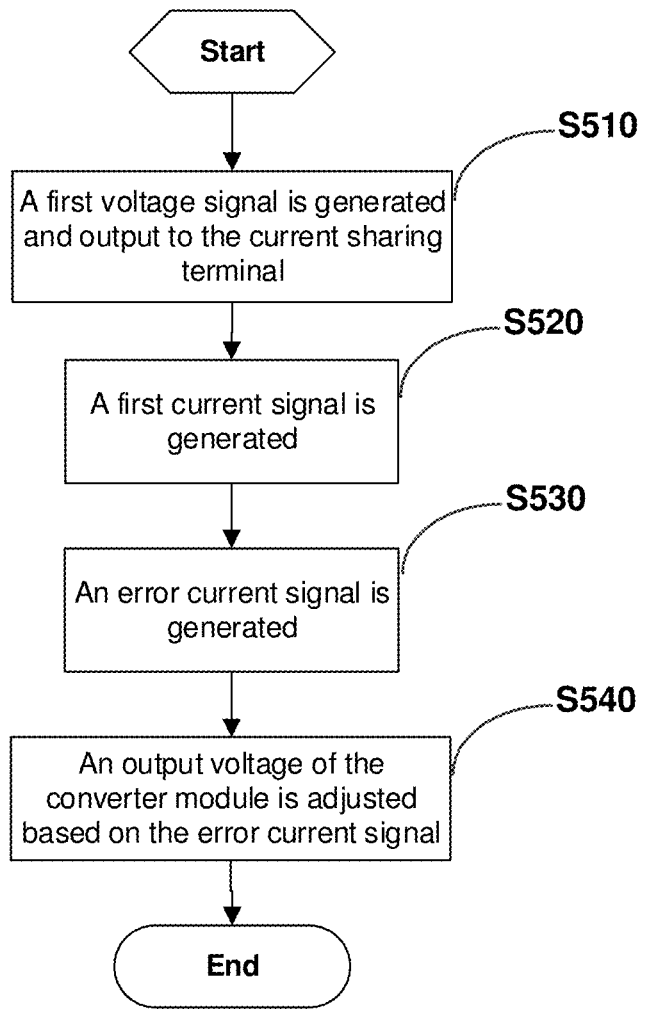
FIG. 5 shows a method of controlling a voltage converter according to a preferred embodiment of the present invention corresponding to the voltage converter shown in FIG. 3.

FIG. 5 shows an example of a method 500 of controlling a voltage converter according to a preferred embodiment of the present invention corresponding to the voltage converter 300 shown in FIG. 3. As shown in FIG. 3, the voltage converter 300 includes a converter module 310 to convert an input voltage to an output voltage, a current sharing terminal 320 to be connected in parallel with a current sharing terminal of each of at least one other voltage converter, and a control circuit 330. The method 500 is performed by the control circuit 330 and includes steps S510 to S540.

In step S510, a first voltage signal proportional to an output current of the converter module 310 with an adjustable first proportional coefficient is generated and output to the current sharing terminal 320. The first proportional coefficient is selected based on whether the voltage converter 300 is a master voltage converter or a slave voltage converter in a current sharing mode.

In step S520, a first current signal proportional to a second voltage signal at the current sharing terminal 320 with a second proportional coefficient is generated. The second voltage signal is a largest voltage signal among the first voltage signal and another voltage signal from each current sharing terminal connected in parallel, and the first proportional coefficient is less than or equal to a reciprocal of the second proportional coefficient.

In step S530, the output current of the converter module 310 is subtracted from the first current signal so as to generate an error current signal.

In step S540, the output voltage of the converter module 310 is adjusted based on the error current signal.

The adjustable first proportional coefficient is adjusted based on whether the voltage converter 300 is a master voltage converter or a slave voltage converter in a current sharing mode, so that a magnitude of the generated first voltage signal may be selected according to a function of the voltage converter 300 in a master-slave current sharing mode, which makes it more difficult, for example, for a magnitude of a first voltage signal of the slave voltage converter to exceed a magnitude of a first voltage signal of the master voltage converter, and thus reduces a frequency of master-slave exchange.

In a preferred embodiment of the present invention, subtracting the output current of the converter module 310 from the first current signal so as to generate an error current signal may include subtracting the output current of the converter module 310 and a margin current from the first current signal so as to generate the error current signal.

In a preferred embodiment of the present invention, the method 500 may further include comparing the first voltage signal with the second voltage signal, and outputting the larger one of the first voltage signal and the second voltage signal as a new second voltage signal. The step may be performed by a comparison circuit 331, for example.

In a preferred embodiment of the present invention, the control circuit 330 may include at least one amplifier 332 having different amplification coefficients. The method 500 may include selecting one of the at least one amplifier having different amplification coefficients so as to generate the first voltage signal. The step may be performed, for example, by a selector 333. For example, one of the amplifiers 332 functions as a master voltage converter and at least one of the amplifiers 332 functions as a slave voltage converter. The selector 333 selects an amplifier or amplification coefficient to be used based on whether the voltage converter 300 is a master voltage converter or a slave voltage converter.

In a preferred embodiment of the present invention, when the voltage converter 300 is the slave voltage converter, the value of the first proportional coefficient may be less than the reciprocal value of the second proportional coefficient, and/or when the voltage converter 300 is the master voltage converter, the value of the first proportional coefficient may be equal to the reciprocal value of the second proportional coefficient.

Specifically, when the voltage converter 300 is the slave voltage converter, the value of the first proportional coefficient may be in a range of about 0.5 times to about 0.6 times the reciprocal value of the second proportional coefficient. However, those skilled in the art understand that, according to different implementations, the value range may also change. Such a change shall fall within the scope of the technical solutions of preferred embodiments of the present invention.

In a preferred embodiment of the present invention, when the voltage converter 300 is the slave voltage converter, and when the voltage converter 300 frequently performs a master-slave conversion, a ratio of the value of the first proportional coefficient to the reciprocal value of the second proportional coefficient is reduced.

In a preferred embodiment of the present invention, when the voltage converter 300 is the slave voltage converter, and when a conversion speed of the voltage converter 300 is slow in a slave-master conversion, a ratio of a value of the first proportional coefficient to a reciprocal value of the second proportional coefficient is increased.

Figure 6:
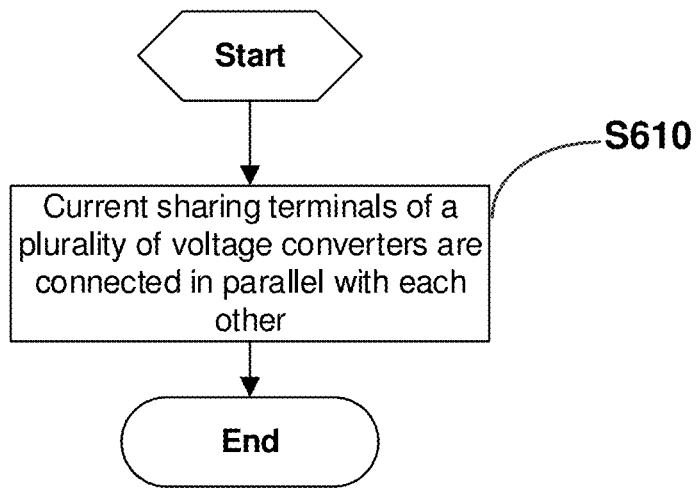
FIG. 6 shows a method of designing a power supply according to a preferred embodiment of the present invention corresponding to the power supply of FIG. 4.

FIG. 6 shows a method 600 of designing a power supply according to a preferred embodiment of the present invention corresponding to the power supply of FIG. 4. As shown in FIG. 6, the method 600 may include step S610 of connecting current sharing terminals 320 of a plurality of voltage converters 300 controlled according to the method shown in FIG. 5 in parallel with each other.

In order to further describe the details of the technical solutions of preferred embodiments of the present invention, the technical solutions of preferred embodiments of the present invention will be described below based on a circuit diagram shown in FIG. 7.

In order to avoid an oscillation caused by an exchange of master/slave functions, the technical solutions of the preferred embodiments of the present invention will reduce or prevent an output of Iout_slave to Vlshare.

In the function of slave voltage converter, the first voltage signal is calculated by setting DeltaV to be greater than 0 and selecting another value of K with DeltaV as a control signal. Thus, in the solution shown in FIG. 7, a lower (even 0) gain K' is selected so that K'×Iout_slave will not be higher than K×Iout_master, and Vlshare is always equal to K×Iout_master.

In the function of master voltage converter, the first voltage signal is calculated by setting DeltaV to be 0 and selecting K with DeltaV as a control signal. In this case, the situation of FIG. 7 is the same or substantially the same as that of FIG. 2.

When an appropriate value (e.g. much less than K) is selected for K', K'×Iout_slave of the slave voltage converter will not be higher than K×Iout_master, so that the master/slave roles may not be changed easily even under a dynamic load condition.

When the voltage converter functions as a slave voltage converter but an output current of the voltage converter is higher than that of other voltage converters, an input of a current sharing PID controller of the voltage converter will eventually drop to 0 and a gain K may be used for the first proportional coefficient used to calculate the first voltage signal. The voltage converter will be changed (back) to the function of master voltage converter without being locked into the function of slave voltage converter.

A value of K' may be determined according to specific implementations. When the value of K' is too small (e.g., much less than K), the master/slave roles of the voltage converter are not easily changed. In this case, however, when a voltage converter exits from the function of master voltage converter, it may take a long time for another voltage converter (which operates as a slave voltage converter) to become a master voltage converter. When the value of K' is too large (e.g., close to K), an effect of avoiding a frequent master-slave switching may not be apparent.

To this end, according to a preferred embodiment of the present invention, the value of K' may be adjusted according to a current working condition of the power supply. For example, when a master-slave conversion occurs frequently in the voltage converter, it is indicated that the value of K' may be too large at present, and a frequency of the master-slave conversion may be reduced by lowering the value of K'. When a slave-master conversion occurs, if a conversion speed of the voltage converter is slow, for example, no voltage converter may become the master voltage converter for a long time, the conversion speed may be increased by increasing the value of K'.

The value of K' of each voltage converter that performs a current sharing in the power supply may be adjusted in any suitable manner. For example, the value of K' of each voltage converter may be controlled by a centralized (micro) controller according to a working condition of the power supply by means of centralized control. For example, a greater K' value may be assigned (or preferentially adjusted) to a voltage converter with better and/or more stable performances, so that the voltage converter may have a greater chance of being the master voltage converter. Certainly, any other specific implementation solutions based on the above-described allocation/adjustment ideas may also be used. The solutions also fall within the scope of the present invention.

Figure 7:
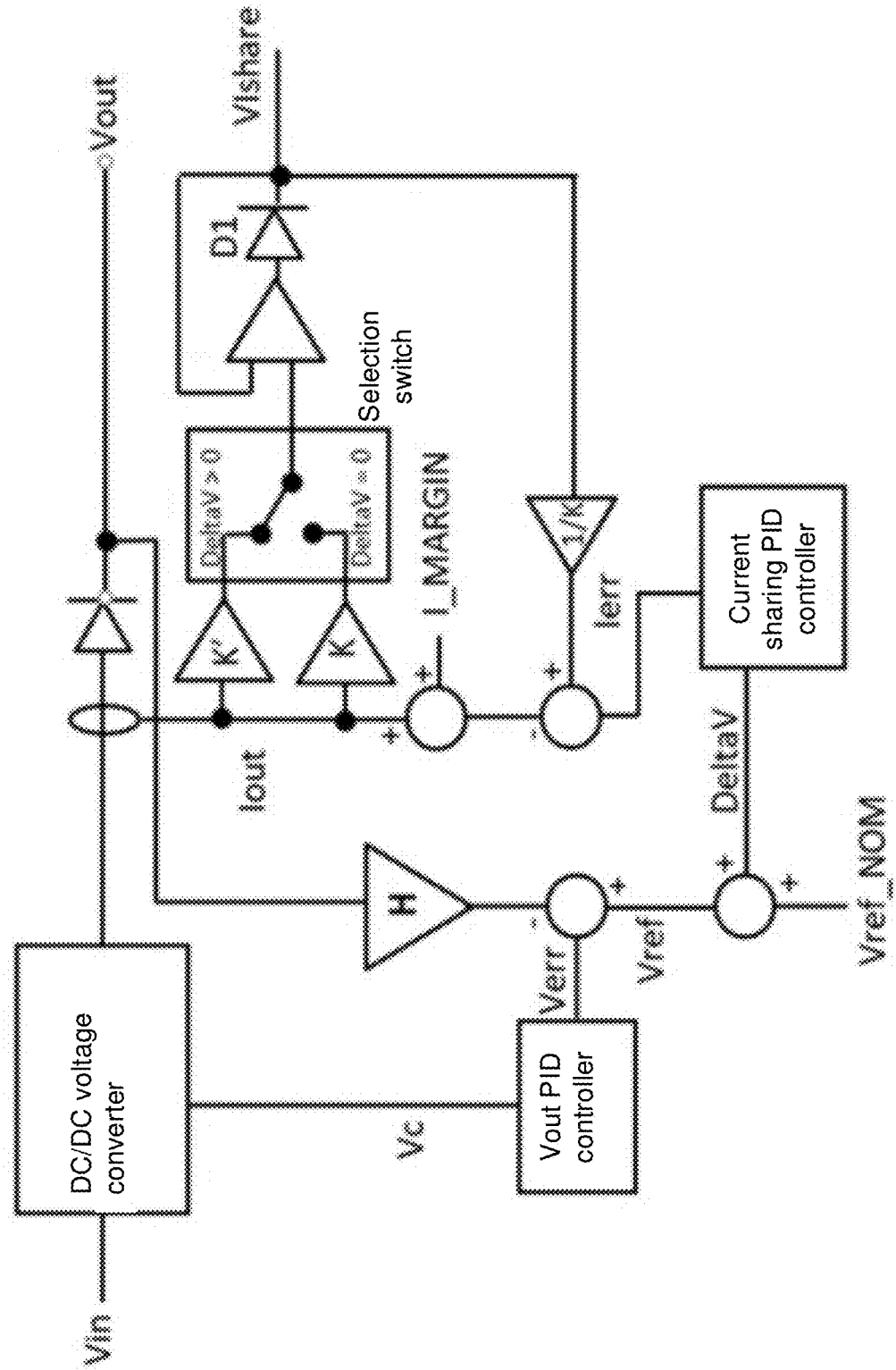
FIG. 7 shows a schematic circuit diagram of a voltage converter according to a preferred embodiments of the present invention.

For example, in the circuit diagram shown in FIG. 7, a corresponding amplifier/first proportional coefficient/amplifier gain may be selected by a selection switch. The selection switch may be provided, for example, in one or more of the following ways.

1. An analog signal multiplexer is used, to which both K×Iout and K'×Iout are input, and the multiplexer selects and outputs one of the two based on a value of DeltaV.

2. A controllable gain amplifier is provided, a gain (a value of K) of which is selected according to a value of DeltaV.

3. A controller including a microcontroller is provided. An analog-to-digital converter of the microcontroller samples Iout, Vlshare and Vout signals, a Vout PID controller and a current sharing PID controller may be provided by firmware, and a value of K may be changed according to DeltaV through firmware.

The above only list some implementations of the selection switch. However, the present invention is not limited thereto. Any available manner in the art may also be used to implement the selection switch.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A voltage converter, comprising:
   a converter module to convert an input voltage to an output voltage;
   a current sharing terminal to be connected in parallel with a current sharing terminal of each of at least one other voltage converter; and
   a control circuit to:
      generate a first voltage signal proportional to an output current of the converter module with an adjustable first proportional coefficient and output the first voltage signal to the current sharing terminal, wherein the first proportional coefficient is selected based on whether the voltage converter is a master voltage converter or a slave voltage converter in a current sharing mode;
      generate a first current signal proportional to a second voltage signal at the current sharing terminal with a second proportional coefficient, wherein the second voltage signal is a largest voltage signal among the first voltage signal and another voltage signal from each current sharing terminal connected in parallel, and the first proportional coefficient is less than or equal to a reciprocal of the second proportional coefficient;
      subtract the output current of the converter module from the first current signal so as to generate an error current signal; and
      adjust the output voltage of the converter module based on the error current signal.

2. The voltage converter according to claim 1, wherein the subtracting the output current of the converter module from the first current signal so as to generate an error current signal includes subtracting the output current of the converter module and a margin current from the first current signal so as to generate the error current signal.

3. The voltage converter according to claim 2, wherein
   the first proportional coefficient is less than the reciprocal of the second proportional coefficient in response to the voltage converter being the slave voltage converter; and/or
   a value of the first proportional coefficient is equal or substantially equal to a reciprocal value of the second proportional coefficient in response to the voltage converter being the master voltage converter.

4. The voltage converter according to claim 2, wherein a ratio of a value of the first proportional coefficient to a reciprocal value of the second proportional coefficient is reduced in response to the voltage converter being the slave voltage converter, and the voltage converter repeatedly performing a master-slave conversion.

5. The voltage converter according to claim 2, wherein a ratio of a value of the first proportional coefficient to a reciprocal value of the second proportional coefficient is increased in response to the voltage converter being the slave voltage converter, and a conversion speed of the voltage converter being reduced in a slave-master conversion.

6. The voltage converter according to claim 1, wherein the control circuit further includes a comparison circuit to compare the first voltage signal with the second voltage signal, and output a larger one of the first voltage signal and the second voltage signal as a new second voltage signal.

7. The voltage converter according to claim 1, wherein the control circuit includes:
   at least one amplifier having different amplification coefficients; and
   a selector to select one of the at least one amplifier so as to generate the first voltage signal.

8. The voltage converter according to claim 1, wherein
   the first proportional coefficient is less than the reciprocal of the second proportional coefficient in response to the voltage converter being the slave voltage converter; and/or
   a value of the first proportional coefficient is equal or substantially equal to a reciprocal value of the second proportional coefficient in response to the voltage converter being the master voltage converter.

9. The voltage converter according to claim 8, wherein the value of the first proportional coefficient is in a range of about 0.5 times to about 0.6 times the reciprocal value of the second proportional coefficient in response to the voltage converter being the slave voltage converter.

10. The voltage converter according to claim 1, wherein a ratio of a value of the first proportional coefficient to a reciprocal value of the second proportional coefficient is reduced in response to the voltage converter being the slave voltage converter, and the voltage converter repeatedly performing a master-slave conversion.

11. The voltage converter according to claim 1, wherein a ratio of a value of the first proportional coefficient to a reciprocal value of the second proportional coefficient is increased in response to the voltage converter being the slave voltage converter, and a conversion speed of the voltage converter being reduced in a slave-master conversion.

12. A power supply comprising a plurality of the voltage converters according to claim 1.

13. A method of controlling a voltage converter, wherein the voltage converter includes a converter module to convert an input voltage to an output voltage, a current sharing terminal to be connected in parallel with a current sharing terminal of each of at least one other voltage converter, and a control circuit, the method comprises:
   generating, by the control circuit, a first voltage signal proportional to an output current of the converter module with an adjustable first proportional coefficient and outputting the first voltage signal to the current sharing terminal, wherein the first proportional coefficient is selected based on whether the voltage converter is a master voltage converter or a slave voltage converter in a current sharing mode;
   generating, by the control circuit, a first current signal proportional to a second voltage signal at the current sharing terminal with a second proportional coefficient, wherein the second voltage signal is a largest voltage signal among the first voltage signal and another voltage signal from each current sharing terminal connected in parallel, and the first proportional coefficient is less than or equal to a reciprocal of the second proportional coefficient;

subtracting, by the control circuit, the output current of the converter module from the first current signal so as to generate an error current signal; and adjusting, by the control circuit, the output voltage of the converter module based on the error current signal.

14. The method according to claim 13, wherein the subtracting the output current of the converter module from the first current signal so as to generate an error current signal includes subtracting the output current of the converter module and a margin current from the first current signal so as to generate the error current signal.

15. The method according to claim 13, further comprising comparing the first voltage signal with the second voltage signal, and outputting a larger one of the first voltage signal and the second voltage signal as a new second voltage signal.

16. The method according to claim 13, wherein the generating a first voltage signal proportional to an output current of the converter module with an adjustable first proportional coefficient includes selecting one of at least one amplifier having different amplification coefficients so as to generate the first voltage signal.

17. The method according to claim 13, wherein the first proportional coefficient is less than the reciprocal of the second proportional coefficient in response to the voltage converter being the slave voltage converter; and/or a value of the first proportional coefficient is equal to a reciprocal value of the second proportional coefficient in response to the voltage converter being the master voltage converter.

18. The method according to claim 17, wherein the value of the first proportional coefficient is in a range of about 0.5 times to about 0.6 times the reciprocal value of the second proportional coefficient in response to the voltage converter being the slave voltage converter.

19. The method according to claim 13, wherein a ratio of a value of the first proportional coefficient to a reciprocal value of the second proportional coefficient is reduced in response to the voltage converter being the slave voltage converter, and the voltage converter repeatedly performing a master-slave conversion.

20. The method according to claim 13, wherein a ratio of a value of the first proportional coefficient to a reciprocal value of the second proportional coefficient is increased in response to the voltage converter being the slave voltage converter, and a conversion speed of the voltage converter being decreased in a slave-master conversion.

* * * * *